Nov. 26, 1935.  J. WARDLE  2,022,016
APPARATUS FOR STRAINING LIQUIDS OR GASES
Filed July 9, 1932   6 Sheets-Sheet 1

JOHN WARDLE
INVENTOR
BY Haseltine, Lake & Co.
ATTORNEYS

Nov. 26, 1935.  J. WARDLE  2,022,016
APPARATUS FOR STRAINING LIQUIDS OR GASES
Filed July 9, 1932  6 Sheets-Sheet 2

JOHN WARDLE
INVENTOR
BY Haseltine, Lake & Co.
ATTORNEYS

Nov. 26, 1935.   J. WARDLE   2,022,016
APPARATUS FOR STRAINING LIQUIDS OR GASES
Filed July 9, 1932   6 Sheets-Sheet 3

JOHN WARDLE
INVENTOR
BY Haseltine, Lake & Co.
ATTORNEYS

Nov. 26, 1935. J. WARDLE 2,022,016
APPARATUS FOR STRAINING LIQUIDS OR GASES
Filed July 9, 1932 6 Sheets-Sheet 5

JOHN WARDLE
INVENTOR
BY Haseltine, Lake & Co.
ATTORNEYS

Nov. 26, 1935.   J. WARDLE   2,022,016
APPARATUS FOR STRAINING LIQUIDS OR GASES
Filed July 9, 1932   6 Sheets-Sheet 6

JOHN WARDLE
INVENTOR
BY Haseltine, Lake & Co.
ATTORNEYS

Patented Nov. 26, 1935

2,022,016

UNITED STATES PATENT OFFICE 2,022,016

APPARATUS FOR STRAINING LIQUIDS OR GASES

John Wardle, Westminster, London, England, assignor to Lolos Strainers Limited, Barrow-in-Furness, England, a British company Application July 9, 1932, Serial No. 621,600
In Great Britain October 14, 1931

20 Claims. (Cl. 210—167)

This invention relates to apparatus for straining liquids or gases, of the kind in which cleaning of the straining means is effected for example by a reverse flow of part of the liquid or gas, i. e. a flow in the opposite direction to the normal flow.

According to one aspect of the invention a space at the outlet side of the straining means (either within the straining means or between the straining means and an outer casing) is provided with one or more partitions or vanes which during the cleaning operation constantly divide the said space into separate sections, and means are provided for reducing the capacity of one or more sections thereby providing cleaning flow of liquid or gas in the opposite direction to that of the normal flow without withdrawing liquid or gas for the cleaning flow from the other section or sections in which the normal flow of liquid or gas continues. In one constructional form of the invention the outlet side of the straining means is divided into sections by yieldingly mounted partitions and the partitions or the straining means are mounted to rotate eccentrically in relation to said space, the arrangement being such that during the rotational movement the capacity of one or more of the said sections will be reduced thereby expelling liquid or gas therefrom in a direction opposite to the direction of normal flow through the straining means. Alternatively, the apparatus may comprise a cylindrical straining means having a piston therein and an arrrangement whereby movement of the piston in one direction causes fluid to be forced through one part of the straining means in a direction opposite to the normal flow, movement of the piston in the other direction forcing liquid or gas through another part of the straining means in the opposite direction to the normal flow. For example, the space on the outlet side of the straining means may be divided into sections of fixed capacity, and the apparatus provided with a cylinder within the straining means, one end of which cylinder comprises an extension of variable capacity of at least one section and the other end of which cylinder comprises a similar extension of at least one other section, a piston within said cylinder, and a valve arrangement that affords communication to the outlet of the apparatus but closes such communication from the section or sections about to be cleaned by reverse flow of liquid or gas effected by reciprocating said piston. In a further constructional arrangement the apparatus is provided with a reciprocating piston normally in a midway position within the straining means and a hollow body carried by the piston and through which hollow body a liquid or gas normally passes from one side of the piston to the other and which hollow body is adapted to enter an outlet aperture when moved in one direction from the normal midway position to trap liquid or gas on one side of the piston and to enter a hollow member when moved in the opposite direction so as to trap liquid or gas on the other side of the piston.

In order that the said invention may be clearly understood and readily carried into effect the same will now be more fully described with reference to the accompanying drawings, in which:—

Figure 9$^A$ is a vertical section of the upper portion of an apparatus similar to that shown in Figure 9 but modified so that the whole of the area of the straining means is normally utilized for straining the liquid or gas;

Figure 10$^A$ is a section on line X$^A$—X$^A$ in Figure 9$^A$;

Figure 11$^A$ is a section on the line XI$^A$—XI$^A$ in Figure 9$^A$; and

Figure 11$^B$ is a view of the underneath surface of the outer casing cover to be described and which is shown in Figure 9$^A$;

Figure 18 is a sectional view somewhat similar to Figures 2 or 5 but showing an arrangement which enables the whole area of the straining means to be normally used for straining;

Figure 18$^A$ also is a sectional view of an apparatus in which the whole area of the straining means can normally be used for straining.

Figures 1, 2, 3, 7, 8:
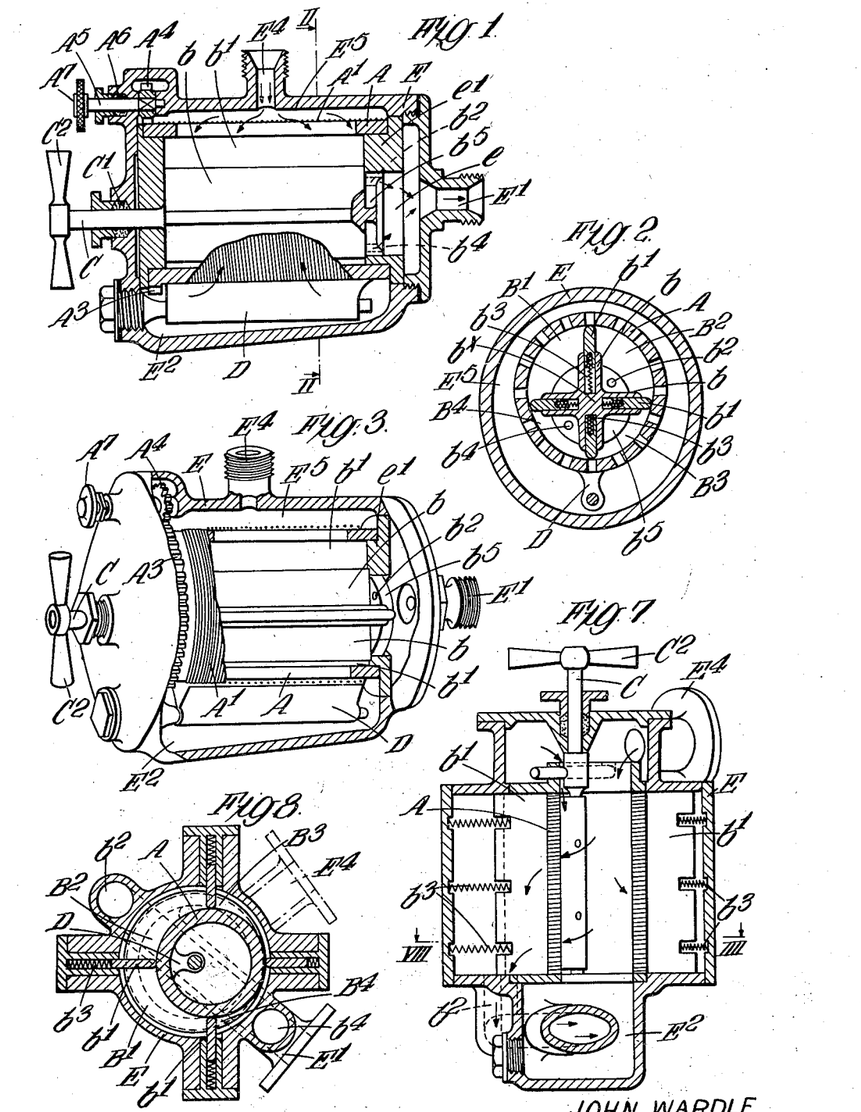
Figure 1 is a vertical longitudinal section of a strainer made in accordance with the invention.
Figure 2 is a section on line II—II in Figure 1.
Figure 3 is a perspective view of the apparatus with parts broken away to show the interior.
Figure 7 is a vertical section of another form of the apparatus.
Figure 8 is a section on line VIII—VIII in Figure 7.

In the arrangement shown in Figures 1, 2 and 3, the straining means comprises a perforated tubular or cylindrical strainer body A and wire $A^1$ wound helically on the exterior of the body A. The outlet side of the straining means comprises the interior of the tubular body A the space within which is divided into sections $B^1$, $B^2$, $B^3$, $B^4$, by vanes, blades, or partitions, comprising vanes $b$ and blades $b^1$. The vanes $b$ are formed integrally with each other and are arranged radially with respect to an axis $b^\times$ about which the vanes $b$ and blades $b^1$ rotate. The axis $b^\times$ is offset from but parallel to the longitudinal axis of the straining means A. The blades $b^1$ are carried in slots in the vanes $b$ and are pressed outwardly by springs $b^3$ so that during the rotation of the vanes $b$ eccentrically with respect to the straining means A the blades $b^1$ will move in or out to maintain contact with the inner surface of the straining means. Attached to one end of the vanes $b$ is a spindle C that passes through a stuffing box $C^1$ to the exterior of the strainer where it is provided with a handle $C^2$ whereby the vanes $b$ can be rotated. Attached to the other end of the vanes $b$ is a plug $b^5$ that is rotatable in a circular opening $e$ in a plate $e^1$ carried by an outer casing E of the strainer. The plug $b^5$ is rotatable in the opening $e$ but has a liquid or gas-tight fit therewith. Apertures $b^2$, $b^4$, in the plug $b^5$ provide permanent communication between the sections $B^2$, $B^4$, respectively, and the opening $e$ and thence to the outlet orifice $E^1$ of the outer casing E. The casing is formed with a sump $E^2$ at its lower portion where it carries a scraper D that engages the wire $A^1$. The tubular body A is provided at one end with peripheral gear teeth $A^3$ engaged by a pinion $A^4$ that is carried by a spindle $A^5$ which passes through a stuffing box $A^6$ to the outside of the outer casing E where the spindle is provided with a knurled nut $A^7$. By these means the straining means can be rotated by rotating the nut $A^7$ so that the wire will be scraped by the scraper D. If desired the tubular body may be rotated by gearing ratchet or other mechanical connection to the main spindle. The normal flow of the liquid or gas occurs from the inlet orifice $E^4$ of the outer casing E into the space $E^5$ between the casing E and the straining means and thence through the straining means into compartments $B^2$, $B^4$, through the apertures $b^2$, $b^4$ to the outlet apertures $E^1$ of the casing E. This normal flow is always constant and has no liquid or gas withdrawn therefrom or other interference during the cleaning operation. The cleaning operation is effected by rotating the partitions $b$, $b^1$, whereupon the larger sections or compartments will become smaller in capacity so that the liquid or gas therein will be forced out through the straining means in the opposite direction to the normal flow thereby cleaning the straining means.

Figure 4:
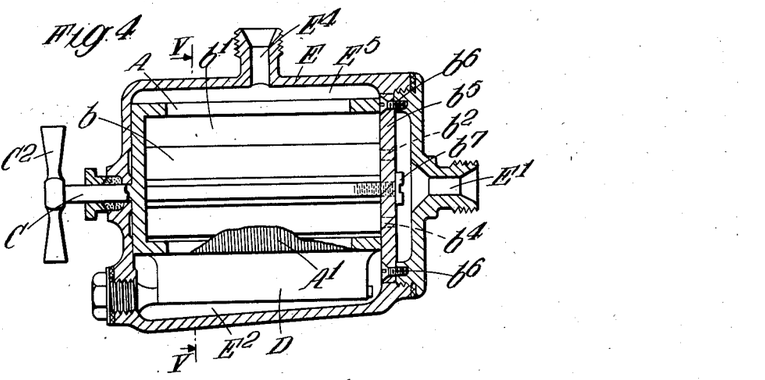
Figure 4 is a view similar to Figure 1 of a modified arrangement.
Figure 5:
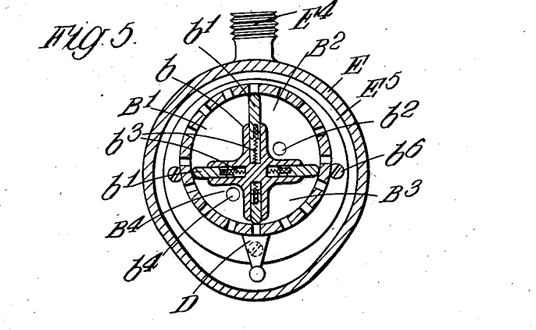
Figure 5 is a section on line V—V in Figure 4.
Figure 6:
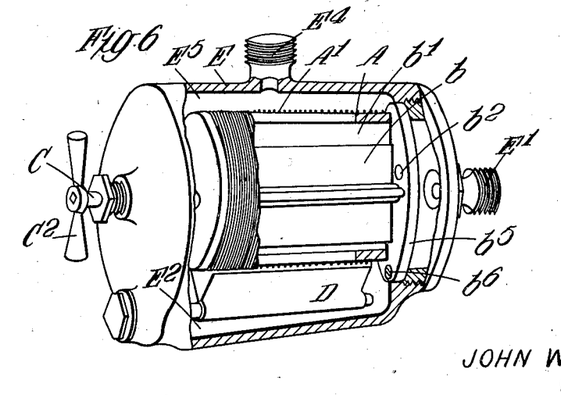
Figure 6 is a view (similar to Figure 3) of the apparatus illustrated in Figures 4 and 5.

The arrangement illustrated in Figures 4, 5 and 6, differs from that above described in that the partitions $b$, $b^1$, are maintained stationary by enlarging the plug $b^5$ and attaching it to the casing E by screws $b^6$ and attaching the vanes $b$ to the plug $b^5$ by a screw $b^7$ and securing the strainer body A to the spindle C. Rotation of the strainer body will cause reverse flow to occur from the sections $B^1$, $B^3$, and simultaneously the outside of the straining means will be scraped by the scraper D. The means $A^3$, $A^4$, $A^5$, $A^6$ and $A^7$, are therefore not provided in this construction.

In the arrangement shown in Figures 7 and 8, the normal flow of liquid or gas occurs through the straining means from the interior of the tubular straining body A to the outside and in this construction the sections $B^1$, $B^2$, $B^3$, $B^4$, are on the outer side of the strainer body A between the strainer body and the outer casing E. The partitions are formed entirely by the blades $b^1$ which are yieldingly mounted in slots in the outer casing E. The straining body A is carried by the spindle C whereby it can be rotated eccentrically with respect to the outer casing thereby causing the required variation in size of the sections referred to. The inlet $E^4$ communicates with the interior of the strainer body A and the sections $B^2$, $B^4$, communicate with the outlet $E^1$ through passages which are marked $b^2$, $b^4$ since they correspond in function to the apertures $b^2$, $b^4$ in Figures 1 to 6.

Figure 9:
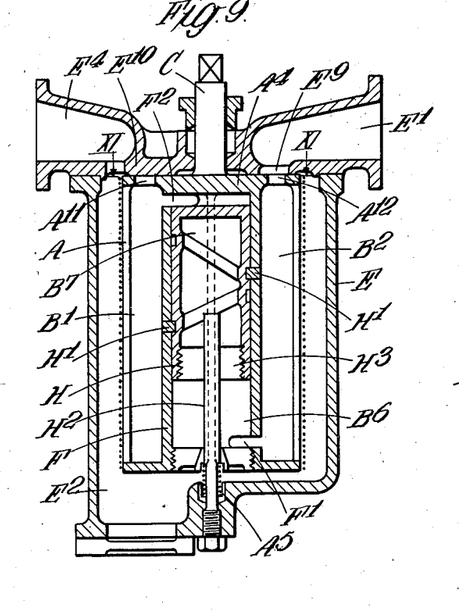
Figure 9 is a vertical section of a further form of the apparatus.
Figure 9A:
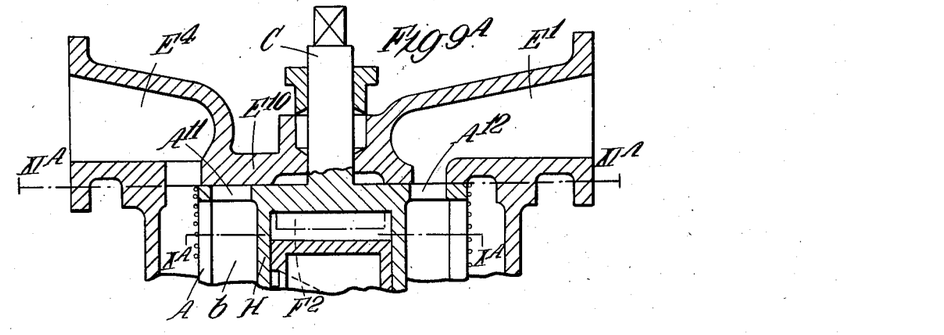
Figure 10:
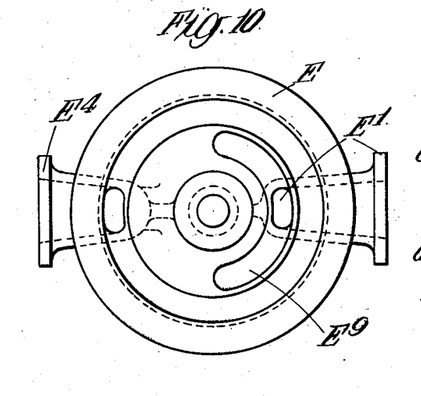
Figure 10 is a view of the underneath surface of the outer casing cover shown in Figure 9.
Figure 10A:
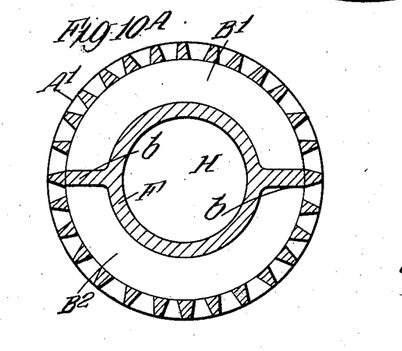
Figure 11:
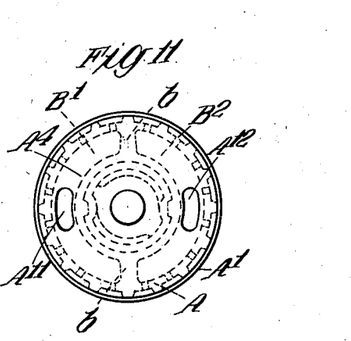
Figure 11 is a plan view on the line XI—XI in Figure 9.
Figure 11A:
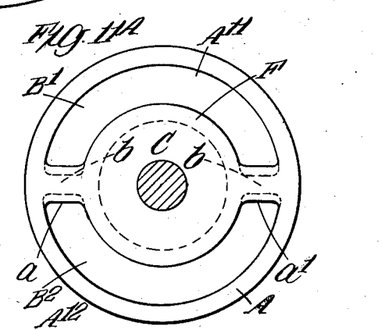
Figure 11B:
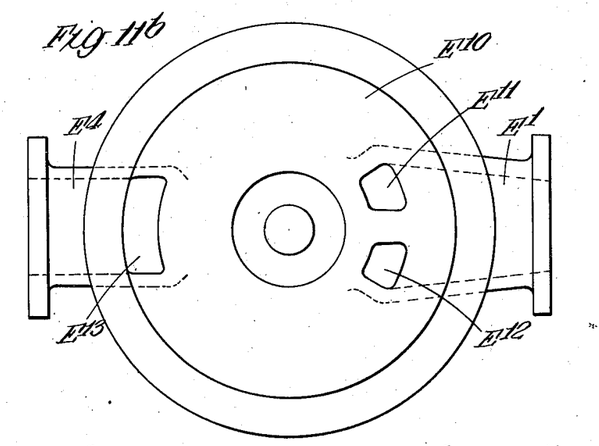

In the construction shown in Figures 9, 10 and 11, the liquid or gas normally flows from the outside to the interior of the strainer body A. Located concentrically within the strainer body is a cylinder F between which and the strainer body is a space on the outlet side of the straining means. This space is divided by partitions $b$ into separate sections $B^1$, $B^2$. The interior $B^6$ of one end of the cylinder F communicates with the section $B^2$ through a port $F^1$ and the interior $B^7$ of the cylinder F at its other end is in communication by a port $F^2$ with the section $B^1$. The ends $B^6$, $B^7$, of the cylinder F constitute in effect parts of the sections $B^2$, $B^1$, respectively. Within the cylinder F is a piston H having two slots each encircling the piston diagonally at opposite angles and engaged by pegs $H^1$ carried by the cylinder F. Rotation of the piston H is prevented by engagement of a square rod $H^2$ in a square aperture formed in a plug $H^3$ carried by the piston H. One end $A^4$ of the strainer body A constitutes a valve plate having ports $A^{11}$, $A^{12}$, in communication respectively with the sections $B^1$, $B^2$. The valve plate is yieldingly held by a spring $A^5$ against the adjacent wall or cover $E^{10}$ of the casing E in which wall is a groove $E^9$ leading to the outlet $E^1$. The strainer body is connected to the spindle C. With the ports in the position shown in Figure 9 rotation of the strainer body A will cause the piston H to descend by reason of the pegs $H^1$ and the slots which they engage thereby forcing the liquid or gas from the end $B^6$ of the cylinder F into section $B^2$ and (when the valve plate $A^4$ shuts off communication between the sections $B^2$ and the outlet $E^1$) out of the strainer body through the straining means in the opposite direction to the normal flow thereby cleaning the straining means adjacent to the section $B^2$. Continued rotation of the strainer body A will similarly cause the straining means adjacent to the section $B^1$ to be cleaned.

Figures 9A, 10A, 11A and 11B, illustrate a modified form of the apparatus shown in Figures 9, 10 and 11, in which modification the whole of the area of the straining means is normally utilized for straining the liquid or gas. A cover $E^{10}$ comprising a detachable part of the casing E is formed with two outlet ports $E^{11}$, $E^{12}$ and is diametrically opposite inlet port $E^{13}$. The ports $A^{11}$, $A^{12}$, are extended into almost semi-circular shape leaving only narrow strips $a$, $a^1$, connecting the strainer body A to the cylinder F. The vanes $b$ and strips $a$, $a^1$, are normally located on one side of the strainer between the outlet ports $E^{11}$, $E^{12}$, and on the other side centrally of the inlet port $E^{13}$, so that normal flow of liquid or gas can occur through both halves of the straining means simultaneously. Rotation of the straining means will shut off communication with the outlet ports $E^{11}$, $E^{12}$, of the sections $B^1$, $B^2$, alternately, during which time the piston H is reciprocated to effect cleaning. During rotation of the straining means, cleaning flow occurs through one of the sections $B^1$, $B^2$, whilst the normal flow continues through the other section.

Figure 12:
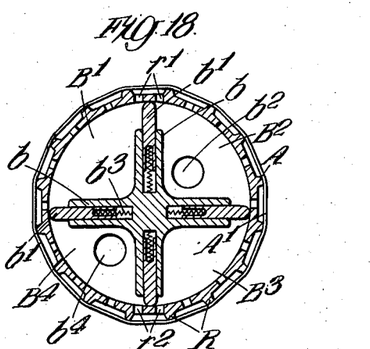
Figure 12 is a vertical section of a still further form of the apparatus.
Figure 13:
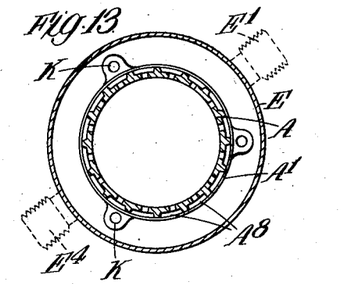
Figure 13 is a section on line XIII—XIII in Figure 12 showing only the casing and straining means.
Figure 14:
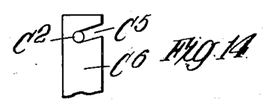
Figure 14 is a detail to be described of a part shown in Figure 12.

Figures 12, 13 and 14, illustrate a further modification in which the normal flow of liquid or gas occurs from the outside of the strainer body to the interior thereof. The sections $B^1$, $B^2$, are divided by the partition $b$ which comprises a piston which can be reciprocated by a reciprocatory movement of the spindle C to which it is connected. The casing E is formed with inwardly directed concentric tubular portions J, $J^1$, and the piston is provided with tubular portion $J^2$, $J^3$, projecting in opposite directions and adapted to enter and form a sliding fit within the tubular portions J, $J^1$, respectively. The strainer body A is provided with grooves $A^8$ through which the liquid or gas passes after having passed between the helices of the wire $A^1$. The grooves $A^8$ are divided into upper and lower series by a rib $A^9$. The upper grooves are provided at their upper ends with apertures $A^{10}$ communicating with the section $B^1$ and the lower series of grooves are provided at their lower ends with apertures $A^{11}$ that communicate with the section $B^2$. The tubular portion J is in communication with the outlet $E^1$. The piston $b$ is normally maintained in its midway position opposite the rib $A^9$ by engagement of the handle $C^2$ in a slot $C^5$ in a plate $C^6$ that is attached to the casing E. In this normal position substantially the whole of the straining means is utilized and liquid or gas from the section $B^2$ passes through $J^3$, $J^2$, and J to the outlet $E^1$ whilst liquid or gas from the section $B^1$ passes through J to the outlet $E^1$. For cleaning the straining means the handle $C^2$ is moved out of the slot $C^5$ by a small rotary movement and is then reciprocated to move the piston $b$ first to one end of its stroke and then to the other end of its stroke and finally back to its midway position. When the piston $b$ is moved from its midway position downwards the extension $J^3$ enters the tubular portion $J^1$ thereby shutting off communication between the section $B^2$ and the outlet. Continued movement of the piston $b$ downwards forces liquid or gas from the section $B^2$ outwards through the straining means in the reverse direction to the direction of normal flow to effect cleaning. Similarly movement of the piston $b$ from its midway position upwards causes the extension $J^2$ to enter the tubular portion J thereby shutting off communication between section $B^1$ and the outlet $E^1$ whereupon continued upward movement causes liquid or gas from the section $B^1$ to be forced outwards through the upper half of the straining means to effect cleaning. The strainer body is held in position within the outer casing by means of bolts K.

Figure 15:
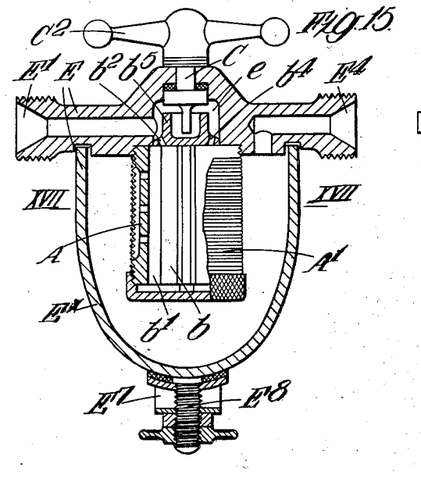
Figure 15 is a vertical central section of an apparatus more particularly intended for a small petrol strainer.
Figure 16:
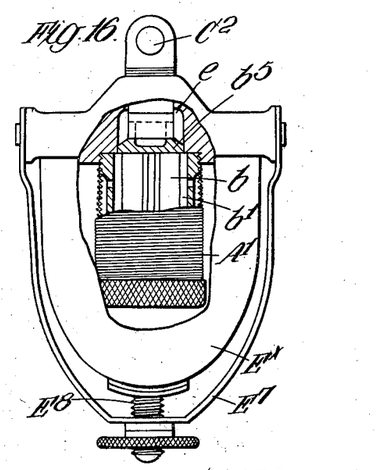
Figure 16 is an end view of the apparatus shown in Figure 15 with parts broken away to expose the interior.
Figure 17:
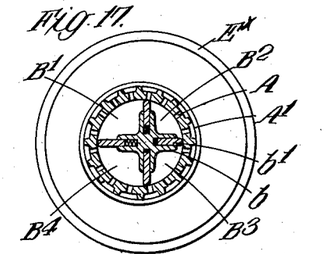
Figure 17 is a section on line XVII—XVII in Figure 15.

Figures 15, 16 and 17, illustrate a modification of a very simple construction more particularly intended for use as a small type petrol strainer. The outer casing E comprises a head plate having the inlet $E^4$, outlet $E^1$, opening $e$, and a lower portion $E^\times$ that is held against the head plate by a screw $E^8$ carried by a stirrup $E^7$ that is suspended from the head plate by its upper ends. The strainer body A is screwed at its upper end to the head plate. The partitions $b$, $b^1$, are rotatable through the spindle C and handle $C^2$ and are provided with a plug $b^5$ having ports $b^2$, $b^4$, therein leading to the opening $e$ in the head plate and thence to the outlet $E^1$, this arrangement being very similar to the arrangement shown in Figure 1.

Figure 18 illustrates an arrangement somewhat similar to that shown in Figure 2 or Figure 5, but in which the whole area of the straining means can be normally utilized for straining. For this purpose a by-pass passage is provided from the sections $B^1$, $B^3$, to the sections $B^2$, $B^4$. The straining body A is formed on its exterior surface with longitudinal ribs R carrying the helically wound wire $A^1$. Between one pair of ribs are two rows of apertures $r^1$ one row being normally arranged on one side of the adjacent partition $b^1$ and the other row being on the opposite side of the partition. Similarly two rows of apertures $r^2$ are arranged between another pair of ribs R and diametrically opposite to the apertures $r^1$. A suitable number of apertures are also provided in the strainer body between all other pairs of ribs R. Liquid or gas flowing through the straining means adjacent to the sections $B^2$, $B^4$, will pass through the sections and out of the apertures $b^2$, $b^4$, whilst liquid or gas passing through the straining means adjacent to the sections $B^1$, $B^3$, will pass through the apertures $r^1$, $r^2$, into sections $B^2$, $B^4$, respectively and thence to the outlet through the apertures $b^2$, $b^4$.

Figure 18A:
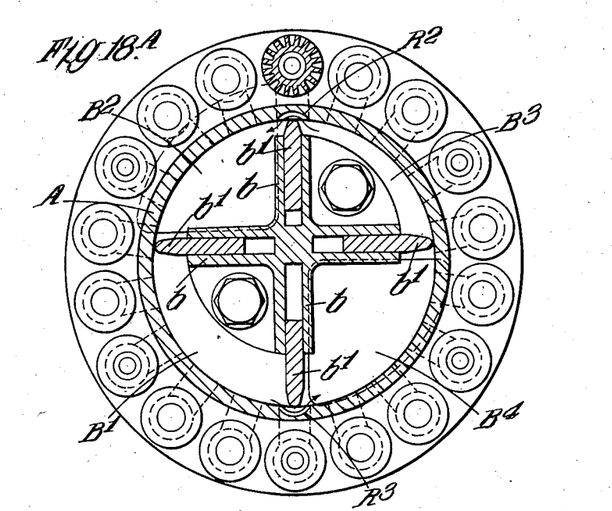

Figure $18^A$ illustrates a modified arrangement of the by-pass enabling the whole area of the straining means to be normally utilized for straining. The strainer body is formed with two diametrically opposite grooves $R^2$, $R^3$, which extend nearly the full length of the strainer body and at each end of which a small bearing surface is left to carry the vanes. Means such as a stop or spring detent (not shown) is provided to facilitate bringing the vanes to rest in the normal position shown in which two of the vanes $b^1$ are adjacent to the grooves $R^2$, $R^3$. Liquid or gas entering sections $B^1$, $B^3$, pass through the grooves $R^2$, $R^3$, to the sections $B^2$, $B^4$ and outlets $b^2$, $b^4$, respectively.

Figure 19:
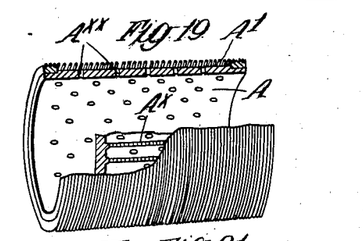
Figures 19, 20, 21 and 22, illustrate various forms of straining means suitable for use with any of the forms of the apparatus shown in the above mentioned figures.

Figures 19, 20, 21 and 22 show types of straining means each of which can be adapted for any of the strainers illustrated in the drawings above described. In Figure 19 the strainer body A is shown provided in its external surface with longitudinal ribs $A^\times$ which communicate through apertures $A^{\times\times}$ with the interior of the strainer body A. The straining wire $A^1$ is wound spirally on the exterior of the strainer body.

Figure 20:
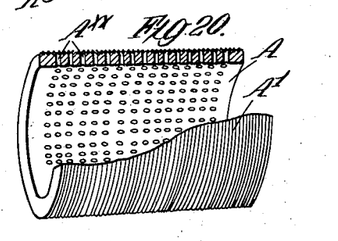
Figure 21:
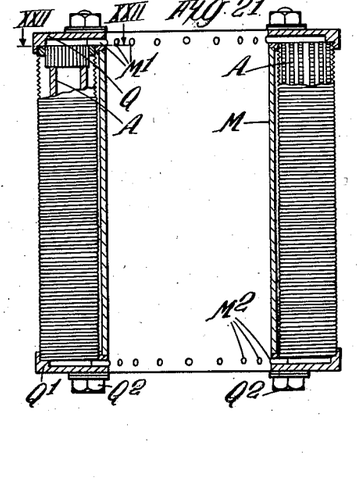
Figure 22:
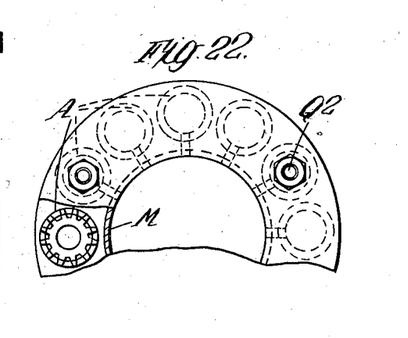

Figure 20 shows a somewhat similar arrangement but without the ribs $A^\times$ and having a greater number of apertures $A^{\times\times}$. Figure 21 is a vertical section of a straining device having a large straining area and Figure 22 is a part plan thereof the lower left-hand corner of Figure 22 being a section on the line XXII—XXII in Figure 21. The arrangement comprises a number of tubular straining bodies A arranged in cylindrical formation about a cylinder M. The strainer bodies A and cylinder M are clamped between a head plate Q and a base plate Q¹ by bolts Q². The liquid or gas passes from the exterior into the interior of the strainer body whence it passes through passages M¹ in the head plate Q and passages M² in the base plate Q¹ into the interior of the cylinder M. The cleaning devices are to be located within the cylinder M.

Instead of helically wound wire the strainer may be built up of annular discs having suitable spacing members or on annular discs indented or serrated to form the straining apertures or the strainer body may be covered with gauze, perforated sheet, fabric, indented wires, or other suitable means.

If desired means may be provided for a continuous drive so that the cleaning operation is continuous throughout the period that the strainer is in use.

What I claim and desire to secure by Letters Patent of the United States is:—

1. Apparatus for straining fluid in which cleaning of the straining means is effected by reverse flow of the fluid, comprising a casing containing the straining means, yieldingly mounted partitioning means arranged so as constantly during the cleaning operation to divide the space on the outlet side of the straining means within the casing into separate sections, a rotary mounting for one of said means which mounting is rotatable about an axis eccentric with respect to said space, and means for rotating one of said means relatively to the other, the arrangement being such that during the rotational movement the capacity of at least one of the said sections will be reduced thereby expelling fluid therefrom for cleaning in a direction opposite to the direction of normal flow through the straining means.

2. Apparatus for straining fluid as in claim 1 in which at least one opening is provided in the straining means which normally affords communication from a section which is to be used for effecting reverse flow for cleaning to another section through which normal flow continues.

3. Apparatus for straining fluid in which cleaning of the straining means is effected by reverse flow of the fluid, comprising a casing containing the straining means, partitions mounted so as to rotate eccentrically within the straining means, said partitions being yieldingly pressed against the straining means and constantly during the cleaning operation dividing the interior of the straining means into separate sections, a permanent communication between at least one section and the outlet and at least one other section having no such communication during the cleaning operation.

4. Apparatus for straining fluids comprising a casing having an inlet and an outlet, cylindrical straining means mounted within the casing, partitions slidably mounted for movement towards and away from the straining means, springs holding the partitions in yielding contact with the straining means, said partitions dividing the space on the outlet side of the straining means within the casing into sections of different capacity, and means to move the straining means relatively to the partitions to vary the capacity of said sections to effect reverse flow cleaning of the straining means.

5. Apparatus for straining fluids as in claim 4 wherein the straining means is mounted eccentrically with respect to the partitions and means are provided to effect relative rotary movement between the straining means and partitions.

6. Apparatus for straining fluids as in claim 4 in which the partitions are mounted within the straining means and are slidably mounted in slots in a holder that is mounted eccentrically within the straining means.

7. Apparatus for straining fluids in which cleaning of the straining means is effected by reverse flow of the fluid comprising a tubular casing having an inlet and an outlet, tubular straining means mounted to rotate eccentrically within the casing, partitions slidably mounted in slots in the casing which partitions constantly during the cleaning operation divide a space between the straining means and the cylinder into separate sections, and springs that hold the partitions normally in engagement with the straining means, said sections being successively brought into communication with the outlet and then closed from such communication during rotation of the straining means.

8. Apparatus for straining fluids in which cleaning of the straining means is effected by reverse flow of the fluid, comprising a casing containing the straining means, at least two partitions arranged so as constantly during the cleaning operation to divide the space on the outlet side of the straining means within the casing into separate sections and means for producing relative movement between said partitions to reduce the capacity of at least one section thereby providing a cleaning flow of liquid in the opposite direction to that of the normal flow without withdrawing fluid for the cleaning flow from the section in which normal flow of fluid continues.

9. Apparatus for straining fluids comprising a plurality of straining bodies each cylindrical and together cylindrically disposed to form a cylindrical straining means, a cylinder within said straining means, communications from the interior of the straining bodies to the space within the cylinder, at least one partition arranged so as constantly during the cleaning operation to divide the space on the outlet side of the straining means within the casing into separate sections, and means for reducing the capacity of at least one section thereby providing a cleaning flow of liquid in the opposite direction to that of the normal flow without withdrawing fluid for the cleaning flow from the section in which normal flow of fluid continues.

10. Apparatus for straining fluids comprising a plurality of straining bodies each cylindrical and together cylindrically disposed to form a cylindrical straining means, a cylinder within said straining means, communications from the interior of the straining bodies to the space within the cylinder, at least two partitions arranged so as constantly during the cleaning operation to divide said space into separate sections, and means for producing relative movement between said partitions to reduce the capacity of at least one section thereby providing a cleaning flow of liquid in the opposite direction to that of the normal flow without withdrawing liquid or gas for the cleaning flow from the section in which normal flow of liquid or gas continues.

11. Apparatus for straining fluids comprising a plurality of straining bodies each cylindrical and together cylindrically disposed to form a cylindrical straining means, a cylinder within said straining means, communications from the interior of the straining bodies to the space within the cylinder, at least one partition dividing said space into sections of large volume and the outer edge of which partition contacts continuously with said cylinder during the cleaning operation, and a member located externally of the casing and arranged for effecting relative rotary movement between said partition and straining means whereby the volume of at least one of the sections is reduced to cause the fluid therein to flow in the reverse direction to the normal flow for cleaning the straining means.

12. Apparatus for straining fluids as in claim 11, wherein said outer edge is in continuous sliding contact with said cylinder during the cleaning operation.

13. Apparatus as in claim 11, having means for holding the partition yieldingly against said boundary wall, and a holder for said partition whereby the axis of relative rotation of the partition is parallel to but offset from the axis of said cylindrical surface.

14. Apparatus as in claim 11, wherein the cylinder is provided with at least one passage which normally provides communication from one section to another.

15. Apparatus for straining fluid comprising a casing having an inlet and an outlet, a number of tubular straining means, a cylinder around which the straining means are arranged and having apertures through which liquid or gas having passed through the straining means can enter into the interior of the cylinder, and partitions mounted to rotate eccentrically within the cylinder and pressed yieldingly towards the cylinder, said partitions being arranged constantly during the cleaning operations to divide the interior of the cylinder into separate sections at least one of which communicates with the outlet and at least one other of which has no such communication.

16. Apparatus for straining fluid comprising a casing having an inlet and an outlet, a number of tubular straining means, a cylinder around which the straining means are arranged and having apertures through which liquid or gas having passed through the straining means can enter into the interior of the cylinder, partitions mounted to rotate eccentrically within the cylinder and pressed yieldingly towards the cylinder, said partitions being arranged constantly during the cleaning operation to divide the interior of the cylinder into separate sections at least one of which communicates with the outlet and at least one other of which has no such communication, and at least one groove formed in the interior surface of the cylinder and arranged so as normally to provide communication from a section having no direct communication with the outlet to another section having such direct communication in order that the whole of the straining means may normally be utilized for straining.

17. Apparatus for straining fluid, comprising a casing, a cylindrical straining device mounted within the casing and having part at least of a space on its outlet side and within its length bounded by a cylindrical surface, at least one partition dividing said space into sections of large volume and the outer edge of which partition contacts continuously with said surface during the cleaning operation, said partition being mounted for relative rotary movement in relation to the straining means, means for holding the partition yieldingly against said surface, a holder supporting said partition with its axis of relative rotation parallel to but offset from the axis of said cylindrical surface, a member located externally of the casing and arranged for effecting movement between said partition and straining means, and an outlet with which each section at the appropriate period is in direct communication so that the fluid can pass from each section to the outlet without first entering another section.

18. Apparatus for straining fluid comprising a casing, a cylindrical straining device mounted within the casing and adapted for straining along at least the greater part of its length and having part at least of a space on its outlet side and within its length bounded by a cylindrical surface, at least one partition located within said part of the length of the straining device and dividing said space into sections of large volume and one edge of which partition contacts continuously with said surface during the cleaning operation, a member located externally of the casing and arranged for effecting relative movement between said partition and straining means, and an outlet with which each section at the appropriate periods is in direct communication so that the fluid can pass from each section to the outlet without first entering another section.

19. Apparatus as in claim 18 wherein said outer edge is in continuous sliding contact with said surface during the cleaning operation.

20. Apparatus for straining fluid as in claim 18, wherein the straining device comprises a plurality of straining bodies each cylindrical and together cylindrically disposed, and having a cylinder within said straining means and communications from the interior of the straining bodies to the space within the cylinder.

JOHN WARDLE.